United States Patent [19]

Allen

[11] 4,369,669
[45] Jan. 25, 1983

[54] RACK AND PINION ASSEMBLY

[75] Inventor: David H. Allen, Yatton, England

[73] Assignee: Cam Gears Limited, Hitchin, England

[21] Appl. No.: 171,349

[22] Filed: Jul. 23, 1980

[51] Int. Cl.³ .................... F16H 19/04; B62D 3/12
[52] U.S. Cl. ........................................ 74/422; 74/498
[58] Field of Search .................... 74/409, 422, 498; 403/333, 334, 372

[56] References Cited

U.S. PATENT DOCUMENTS

| | | | |
|---|---|---|---|
| 719,562 | 2/1903 | Brush | 74/498 |
| 3,092,175 | 6/1963 | Suessle | 24/214 |
| 3,910,627 | 10/1975 | Meyer | 403/365 |
| 4,008,627 | 2/1977 | Bradshaw et al. | 74/498 |
| 4,016,774 | 4/1977 | Baker et al. | 74/498 |
| 4,116,085 | 9/1978 | Bishop | 74/498 |
| 4,215,591 | 8/1980 | Bishop | 74/498 |
| 4,218,933 | 8/1980 | Allen et al. | 74/498 |

FOREIGN PATENT DOCUMENTS

| | | | |
|---|---|---|---|
| 2001478 | 11/1973 | Fed. Rep. of Germany | 74/498 |
| 2222002 | 11/1973 | Fed. Rep. of Germany | 74/498 |
| 655130 | 7/1951 | United Kingdom | 74/498 |
| 848592 | 9/1960 | United Kingdom | 74/498 |
| 1235458 | 6/1971 | United Kingdom | 74/498 |
| 1289815 | 9/1972 | United Kingdom | 74/498 |
| 1468183 | 3/1977 | United Kingdom | 74/498 |
| 2012911 | 8/1979 | United Kingdom | 74/422 |
| 2013304 | 8/1979 | United Kingdom | 74/422 |

Primary Examiner—Lawrence J. Staab
Attorney, Agent, or Firm—Yount & Tarolli

[57] ABSTRACT

A rack and pinion assembly in which a rack bar (1) is longitudinally displaceable through a housing (2) by rotation of a pinion (4) engaging with the rack (3). The rack bar (1) is supported in engagement with the pinion (4) by a plastics moulded bearing member (7) having a saddle-shaped bearing part (9) and a tubular retaining part (8) which is displaced longitudinally from the part (9). The bearing part (9) is of saddle-shape to straddle the rack bar (1) opposite to the region of engagement between the rack and pinion teeth and has a resilient bearing surface which biases the rack bar laterally into engagement with the pinion. The straddling portions of the saddle-shape restrain the rack bar from displacement in the direction of the pinion axis (4a). The retaining part (8) locates the bearing member (7) in the housing (2) and restrains that member from rotation (by keying engagement between rib (11) and channel (12)) and from longitudinal displacement by its co-operation in an annular recess (15). The bearing member (7) can co-operate with the recess (15) by snap engagement during initial location of the bearing member.

Preferably the saddle-shaped bearing part (9) has three discrete circumferentially spaced bearing surfaces each of part cylindrical profile which slidably engage with a complementary cylindrical profile on the rack bar (1).

The bearing member (7) can be a one piece moulding in resilient plastics and the bearing part (9) can be preloaded by its assembly with the rack bar to constantly bias the rack bar into engagement with the pinion.

12 Claims, 4 Drawing Figures

RACK AND PINION ASSEMBLY

DESCRIPTION

This invention relates to a rack and pinion assembly and bearing means therefor.

More particularly, the invention is concerned with a rack and pinion assembly of the kind (hereinafter referred to as "of the kind specified") comprising a rack bar having a longitudinally extending axis and being longitudinally displaceable in a housing, a pinion rotatably mounted in the housing and having its teeth in engagement with the teeth in a rack of the rack bar so that rotation of the pinion effects a longitudinal displacement of the rack bar relative to the housing, and bearing means located between the rack bar and the housing on the side of the rack bar remote from the pinion and substantially opposite the region of engagement between the pinion teeth and the rack teeth for slidably supporting the rack bar in a sense to maintain its teeth in engagement with the pinion teeth.

In rack and pinion assemblies of the kind specified it has hitherto been proposed to provide bearing means in the form of a spring or resiliently biased yoke mounted in an appropriate yoke chamber (usually formed by the housing as an extension of the pinion chamber) oppositely to the pinion. Although such a yoke is effective for maintaining the rack and pinion teeth in engagement it is, together with its housing, a relatively expensive fitment to provide in the assembly. It has also been proposed to provide bearing means in the form of a bush which is secured relative to the housing at a position longitudinally spaced from the pinion and through which bush the rack bar is slidable; it is found however that the location of such a bush at a position longitudinally remote from the region of engagement between the rack and pinion teeth tends to be inefficient for restraining bowing or lateral deflection of the rack bar under heavy loads which are transmitted to the rack bar when the pinion is subjected to a high torque (such bowing or lateral deflection resulting in the pinion teeth and the rack teeth moving out of engagement). It is an object of the present invention to provide a rack and pinion assembly of the kind specified with bearing means which bearing means alleviates the aforementioned disadvantages of hitherto proposed structures, is economical to manufacture and install and which will provide efficient support for maintaining the rack and pinion teeth in engagement.

According to the present invention there is provided a rack and pinion assembly of the kind specified in which the bearing means comprises a bearing member having a retaining portion and a bearing portion extending longitudinally from the retaining portion, said retaining portion engaging with a seating in the housing adjacent to the pinion to locate the bearing member in the housing with the bearing portion situated between the rack bar and the housing on the side of the rack bar remote from the pinion and substantially opposite to the region of engagement between the teeth of the rack and pinion, said bearing portion slidably supporting the rack bar in a sense to maintain its rack in engagement with the pinion.

Further according to the present invention there is provided a bearing member for use in a rack and pinion assembly as specified in the immediately preceding paragraph.

Preferably the retaining portion is in the form of a tubular portion through which the rack bar is longitudinally displaceable. For convenience the retaining portion will hereinafter be discussed as a tubular portion (although it will be realised that the retaining portion can take other forms, such as a saddle shape over which the rack bar is displaceable).

Desirably the bearing portion of the bearing member has a resilient bearing surface (for example the bearing portion can be formed of or carry a resilient or elastomeric material) which biases the rack bar to urge its teeth into engagement with those of the pinion. Usually the resilient bearing surface will be pre-loaded during manufacture of the assembly to provide a constant lateral biasing effect on the rack bar to maintain its teeth in engagement with the pinion. Conveniently the bearing portion will be formed integral with the tubular portion, for example as a one piece moulding in plastics material having appropriate resilient, frictional and load bearing properties (an example of a suitable polyester elastomer in which the bearing member can be moulded is that sold under the Trade Mark "HYTREL" by the Du Pont Company).

In its simplest form the bearing portion of the bearing member may comprise a pad over which the rack bar is slidable and which supports the rack bar to maintain the rack teeth in engagement with the pinion.

Desirably the bearing member includes lateral stabilizing means which engage with the rack bar in a sense to restrain the rack bar against lateral displacement relative to the housing in the general direction of the axis about which the pinion is rotatable. In a preferred construction the bearing portion is in the form of a saddle which receives and straddles the rack bar so that the rack bar is slidable longitudinally through both the saddle and the tubular portion during its displacement relative to the housing; by use of such a saddle-shaped bearing portion not only can the rack bar be supported in a sense to maintain the rack and pinion teeth in engagement but also the straddling parts of the saddle provide lateral stabilizing means to support the rack bar against the aforementioned lateral displacement in the direction of the pinion axis. Alternatively, or in addition, lateral stabilizing means can be provided which are longitudinally displaced from the bearing portion; for example such means can be in the form of opposed support surfaces (such as pads) which are carried by the retaining portion (and conveniently moulded integral therewith) to slidably engage with laterally opposed surfaces of the rack bar and provide the lateral support as aforementioned.

When the bearing portion is in the form of a saddle as aforementioned, the concave surface of the saddle within which the rack bar is received can be formed as three discrete bearing surface parts which slidably engage the surface of the rack bar, that is a lower bearing surface part which slidably engages the surface part of the rack bar which is directly opposite to the rack and primarily serves to support the rack bar teeth in engagement with the pinion and, opposed flank bearing surface parts which slidably engage laterally opposed surface parts of the rack bar and primarily serve to support the rack bar against displacement relative to the housing in the general direction of the pinion axis as aforementioned. By spacing the three bearing surface parts about the periphery of the rack bar the sliding friction between these parts and the rack bar can be maintained at a minimum and further the resilient, elastomeric, wear resistant or other properties of the individual bearing surface parts can be determined as necessary. For example the lower bearing surface part can be of predetermined thickness and of a resilient material which is intended for pre-loading by compression under its engagement with the rack bar. Usually the rack bar will be machined from cylindrical stock and the saddle (or its concave surface) is conveniently of approximately part cylindrical shape to slidably engage with the cylindrical surface of the rack bar in substantially complementary manner.

If the rack bar is of "T" section, the bearing member can include abutment means (such as flanges) which slidably engage the laterally opposed sides of the rail or stem part of the "T" sectioned rack bar to restrain rotation of the rack bar relative to the bearing member and also provide lateral stabilising means for the rack bar; conveniently the abutment means are located in the aforementioned saddle of the bearing portion.

The tubular portion can be of any desired lateral section but conveniently it is substantially cylindrical to be mounted in a complementary substantially cylindrical recess in the housing. Keying means in the form of a rib, recess, projection or otherwise can be provided on the tubular portion for engagement with appropriate keying means on the housing to restrain rotational and longitudinal movement of the bearing member relative to the housing.

One embodiment of the present invention will now be described, by way of example only, with reference to the accompanying illustrative drawings, in which.

Figure 1:
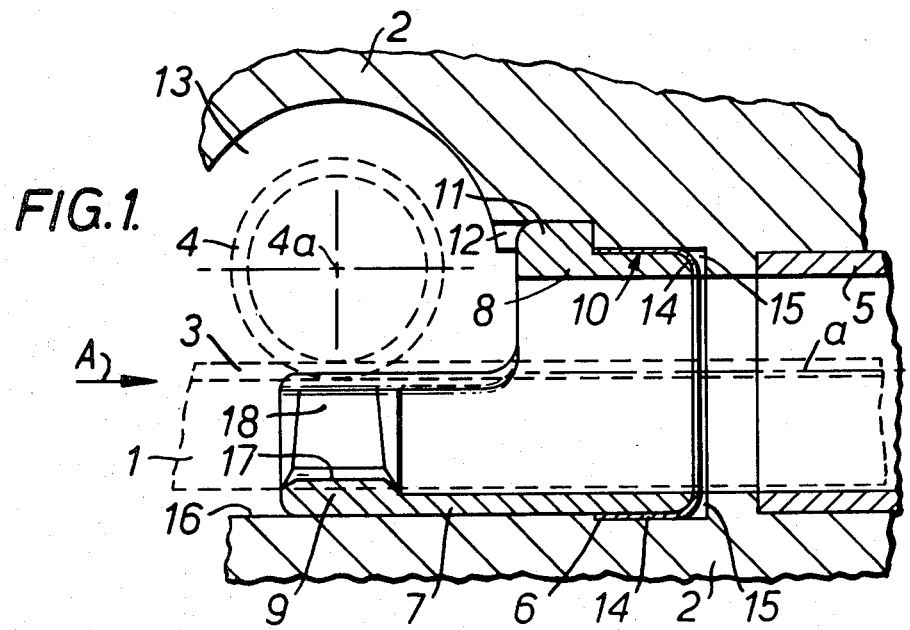
FIG. 1 is a longitudinal section through part of a rack and pinion assembly of the kind specified and which includes bearing means in accordance with the present invention.

The rack and pinion assembly shown in FIG. 1 includes a rack bar 1 having a longitudinally extending axis a and which is longitudinally displaceable in a housing 2. The rack bar has a rack 3 which engages with the teeth of a pinion 4 which is mounted for rotation about its axis 4a in a pinion chamber 13 of the housing 2. For convenience the rack bar 1 and pinion 4 are illustrated by broken lines in FIG. 1 but these are conventionally arranged whereby upon rotation of the pinion 4 the rack bar 1 is driven longitudinally through the housing 2. The rack and pinion assembly can form part of a vehicle steering gear in which the rack bar is coupled to a steering linkage and the pinion is rotated by means of a steering column. A tubular extension (partly shown at 5) is provided on the housing 2 through which the rack bar is longitudinally displaceable.

Located within the housing 2 is bearing means 6 for the rack bar comprising a bearing member 7 having a tubular portion 8 and a bearing portion 9 which extends longitudinally from an end of the tubular portion. The tubular portion 8 is of generally cylindrical profile and engages with a substantially complementary bored seating 10 in the housing adjacent to the pinion 4 and its chamber to locate the bearing member 7 in the housing so that the rack bar extends through the tubular portion and that the bearing portion 9 is situated between the rack bar 1 and the housing 2 on the side of the rack bar remote from the pinion 4 (and substantially opposite to the region of engagement between the pinion teeth and the rack 3). Extending radially outwardly from the external cylindrical surface of the tubular portion 8 is a longitudinally extending rib 11 which mates with a complementary channel 12 in the housing and which channel extends from the pinion chamber 13. The end of the tubular portion 8 remote from the bearing portion 9 carries an external metal reinforcing sleeve 14 which is bonded or otherwise secured to the tubular portion and serves to protect that portion. In addition the sleeve 14 engages in a substantially complementary annular recess 15 in the housing and this engagement together with the engagement of the rib 11 with the channel 12 serve to restrain the bearing means 6 from movement relative to the housing 2 (more particularly the rib 11 and channel 12 restrain the bearing member 7 from rotational movement while the co-operating sleeve 14 and recess 15 restrain the bearing member 7 from longitudinal movement in the housing. The bearing means 7 is received in a complementary bore 16 in the housing, the diameter of the bore 16 being substantially equal to the diameter of the tubular portion 8. Location of the bearing means in the housing 2 is achieved, prior to location and assembly of the rack bar 1 and pinion 4, simply by push fitting the bearing means through the housing until the rib 11 co-operates with the channel 12 and the sleeve 14 snap engages in the recess 15 by spring action of the end of the tubular portion 8 which carries the sleeve 14. When the bearing member made of a resilient material is pushed through the substantially complementary bore 16, the end of the tubular portion 8 and sleeve 14 are compressed so that sleeve 14 can move through the bore 16. When possible, the end of the tubular portion 8 which carries the sleeve 14 expands in a spring fashion thus providing for engagement of the sleeve 14 in the complementary recess 15. The co-operation between the rib 11 and channel 12 also serves as a convenient means for appropriately aligning the bearing member in the housing on assembly.

The bearing portion 9 is in the form of a saddle which receives and straddles the rack bar 1 so that the rack bar is slidable through both the saddle 9 and the tubular portion 8 during its longitudinal displacement along axis a. The saddle 9 has an external part cylindrical surface formed by a continuous extension of the external cylindrical surface of the tubular portion 8 and this surface, like the part of the external cylindrical surface of the tubular portion 8 (which is not enclosed within the sleeve 14) is slidably received within the substantially complementary bore 16 in the housing. The rack bar 1 is machined from cylindrical stock and, except for the rack 3, the portion of the rack bar which is slidable through the saddle 9 has a cylindrical surface of radius x (see FIG. 2).

The concave surface of the saddle 9 is of generally part cylindrical configuration and has three bearing surface parts which are circumferentially spaced around the cylindrical profile of the rack bar 1. Of these bearing surface parts a lower bearing surface part 17 slidably engages the surface of the rack bar which is directly opposite to the rack and opposed flank bearing surface parts 18 and 19 slidably engage laterally opposed surfaces of the rack bar adjacent to the rack 3. The lower bearing surface part 17 primarily serves to support the rack bar 1 with its rack teeth 3 in engagement with the pinion 4 while the opposed flank bearing surface parts 18 and 19 primarily serve to support the rack bar against lateral displacement relative to the housing in the general direction of the pinion axis 4a. The bearing member 7 is formed in resilient material (for example by injection moulding in a polyester elastomer sold under the Trade Mark "HYTREL" by the Du Pont Company) and the resilient and elastomeric characteristics of the material are utilised at the lower bearing surface part 17 to bias the rack bar 1 in a sense to maintain its teeth in engagement with those of the pinion. For this latter purpose the material carrying the lower bearing surface part 17 is arranged to be pre-loaded by compression of such material upon assembly of the rack bar and pinion. In the present embodiment each of the bearing surface parts 17, 18 and 19 is part cylindrical and of radius x equal to that of the cylindrical surface of the rack bar 1. However, as will be appreciated by reference to FIG. 2, when the rack bar 1 is operatively engaged with the teeth of the pinion 4 the centre of curvature of the cylindrical surface of the rack bar 1 is located with respect to the housing, on a longitudinally extending axis b and the opposed flank bearing surface parts 18 and 19 have their respective radii of curvature x struck from the axis b. The part cylindrical lower bearing surface part 17 however has its radius of curvature (indicated at x' in FIG. 2) struck from a longitudinally extending axis d which is parallel to the axis b and is on the side of the axis b remote from the surface part 17. As a consequence of this geometrical configuration of the saddle, and in the absence of the rack bar 1, the lower bearing surface part 17 projects inwardly of the adjacent flank bearing surface parts 18 and 19. Upon assembly of the rack bar 1 in the saddle 9 and with the pinion 4, the material carrying the lower bearing surface part 17 is compressed laterally to the extent indicated at 1' in FIG. 2 to resiliently bias the rack bar in a sense to maintain the rack teeth in engagement with those of the pinion while the material carrying the opposed flank bearing surface parts 18 and 19 is subjected to little or no compression (even though these latter bearing surface parts slidably engage the cylindrical surface of the rack bar). It will be noted that longitudinally extending grooves 20 and 21 are provided in the concave surface of the saddle 9 between the respectively adjacent bearing surface parts; these grooves facilitate lubrication of the slidably engaging surfaces and can accommodate material of the bearing member which is deformed during pre-loading of the lower bearing surface part 17. If required, longitudinally extending grooves 22 and 23 (see FIG. 2) can be provided in the part cylindrical external surface of the saddle 9 and in generally radial alignment with the grooves 20 and 21 respectively to facilitate the local deformation of the saddle 9 during the aforementioned pre-loading.

Figures 2, 4:
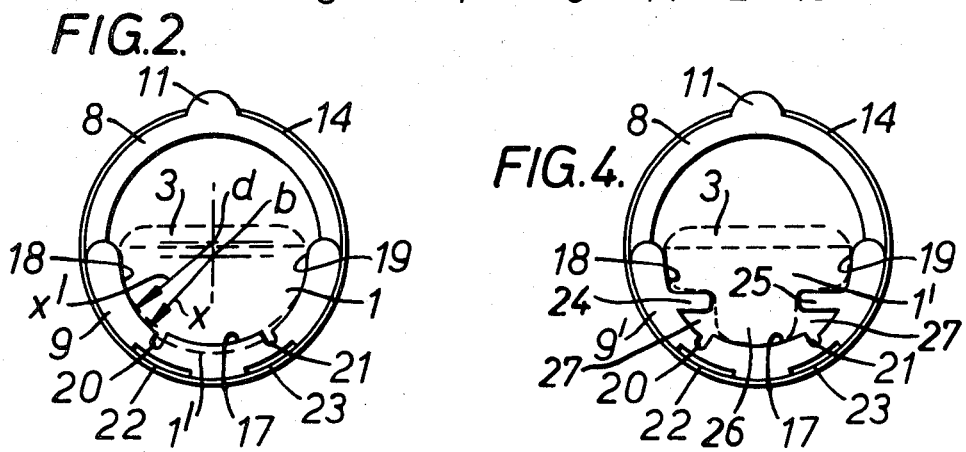
FIG. 2 is an end elevation of the bearing means incorporated in the assembly of FIG. 1, the end elevation being that viewed from the direction of arrow A in FIG. 1.
FIG. 4 is a similar view to that shown in FIG. 2 and illustrates a modified form of the bearing means for use with a "T" section rack bar.
Figure 3:
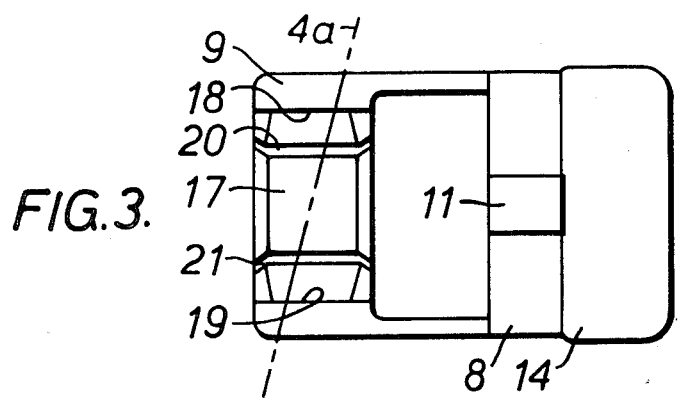
FIG. 3 is a plan view of the bearing means shown in FIG. 2.

In the modification shown in FIG. 4 the bearing member 7 has its bearing portion shown at 9' modified to co-operate with a "T" section rack bar indicated at 1'. The portion 9' has integrally formed therewith a pair of opposed inwardly directed lateral flanges 24, 25 which slidably co-operate with laterally opposed sides of the rail or stem part 26 of the "T" section rack bar 1'. The sliding co-operation between the flanges 24, 25 and the rail part 26 restrains the rack bar 1' from rotating within the bearing means, generally stabilizes the rack bar in the bearing means and, as will be seen from FIG. 4, provides passages 27 to facilitate flow of lubrication fluid. The flanges 24, 25 can, if required, slidably engage with the underside faces of the shoulders of the "T" section rack bar so that the resilience of the flanges biases the rack 3 into engagement with the pinion.

I claim:

1. A rack and pinion assembly comprising a housing, a rack bar having a longitudinally extending axis and being longitudinally displaceable in said housing, a pinion rotatably mounted in said housing and having its teeth in engagement with the teeth of said rack bar so that rotation of said pinion effects a longitudinal displacement of said rack bar relative to said housing, a bearing member located between said rack bar and said housing, said bearing member having a tubular retaining portion through which the rack bar is longitudinally displaceable and a bearing portion extending longitudinally from said tubular retaining portion, the length of said bearing portion measured along the rack bar axis being less than the length of said retaining portion measured along the rack bar axis, said bearing portion slidably supporting said rack bar to maintain the teeth of said rack bar in engagement with the teeth of said pinion, said tubular retaining portion being spaced from said rack bar, said bearing portion being located between said rack bar and said housing on the side of said rack bar remote from said pinion and opposite to the region of engagement between the teeth of said rack bar and pinion, and means carried on said tubular retaining portion and cooperating with respective means in said housing for retaining said bearing member from longitudinal and rotational displacement relative to said housing.

2. An assembly as claimed in claim 1 in which the bearing portion has a resilient bearing surface which biases the rack bar to urge its teeth into engagement with those of the pinion.

3. An assembly as claimed in claim 2 in which the material of the resilient bearing surface is pre-loaded to provide a constant lateral biasing effect on the rack bar to maintain its teeth in engagement with the pinion.

4. An assembly as claimed in claim 1 in which the bearing member includes lateral stabilizing means which engage with the rack bar in a sense to restrain the rack bar against lateral displacement relative to the housing in the general direction of the axis about which the pinion is rotatable.

5. An assembly as claimed in claim 4 in which the bearing portion is in the form of a saddle which receives and straddles the rack bar, the straddling parts of said saddle providing the lateral stabilizing means.

6. An assembly as claimed in claim 5 in which the concave surface of the saddle within which the rack bar is received has three discrete bearing surface parts which slidably engage the surface of the rack bar, said parts comprising a lower bearing surface part which engages the surface part of the rack bar which is directly opposite to the rack and opposed flank bearing surface parts which engage laterally opposed surface parts of the rack bar to provide the lateral stabilizing means.

7. An assembly as claimed in claim 6 in which the surface of the rack bar which slidably engages the concave surface of the saddle is substantially part cylindrical and each of said three discrete bearing surface parts is substantially part cylindrical to slidably engage with the rack bar in substantially complementary manner.

8. An assembly as claimed in claim 1 in which the bearing member is a one piece resilient plastics moulding.

9. An assembly as claimed in claim 1 in which the rack bar is of substantially "T" section having a longitudinally extending rail part and the bearing member includes abutment means which slidably engage laterally opposed sides of said rail part to restrain rotation of, and to stabilize, the rack bar relative to the bearing member.

10. An assembly as claimed in claim 9 in which the abutment means comprises opposed flanges on the bearing portion.

11. An assembly as claimed in claim 1 wherein said means for retaining said bearing member from longitudinal and rotational displacement includes keying means, said keying means including a longitudinally extending rib extended radially outwardly from the external surface of said retaining portion of said bearing member and received in a complementary channel provided in said housing.

12. An assembly as claimed in claim 1 wherein said bearing member is locatable in said housing by being pushed through a complementary bore provided in said housing, and said means for retaining said bearing member from longitudinal and rotational displacement includes an external metal reinforcing sleeve at the end of said tubular retaining portion opposite said bearing portion, said external metal sleeve being fixedly secured to said tubular retaining portion, and snap engaging a complementary seat provided in said housing for retaining said bearing member from longitudinal displacement relative to said housing.

* * * * *